(12) United States Patent
Tsiatsikas et al.

(10) Patent No.: US 11,729,224 B2
(45) Date of Patent: Aug. 15, 2023

(54) METHOD AND SYSTEM FOR ESTABLISHING OPTIMIZED DATA STREAMS IN A NETWORK

(71) Applicant: Unify Patente GmbH & Co. KG, Munich (DE)

(72) Inventors: Zisis Tsiatsikas, Salonika (GR); Eirini Michopanou, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/887,541

(22) Filed: Aug. 15, 2022

(65) Prior Publication Data

US 2023/0084100 A1 Mar. 16, 2023

(30) Foreign Application Priority Data

Sep. 9, 2021 (EP) .................................. 21195810

(51) Int. Cl.
*H04L 65/1069* (2022.01)
*H04L 65/1104* (2022.01)
(52) U.S. Cl.
CPC ...... *H04L 65/1069* (2013.01); *H04L 65/1104* (2022.05)
(58) Field of Classification Search
None
See application file for complete search history.

(56) References Cited

U.S. PATENT DOCUMENTS

| 7,760,744 | B1 | 7/2010 | Mohaban |
| 8,346,945 | B2 | 1/2013 | Bouazizi |
| 9,281,964 | B2 | 3/2016 | Xie et al. |
| 2012/0320912 | A1 | 12/2012 | Estrada et al. |

FOREIGN PATENT DOCUMENTS

EP          4016951 A1 *  6/2022  ......... H04L 65/1006

OTHER PUBLICATIONS

European Search Report for European Application No. 21195810.3 dated Feb. 16, 2022.
"NENA Detailed Functional and Interface Standards for the NENA i3 Solution", prepared by: National Emergency Number Association (NENA) Interconnection and Security Committee, i3 Architecture Working Group; Copyright 2016 National Emergency Number Association, Inc.; NENA-STA-010.2-2016 (originally 08-003), Sep. 10, 2016.

* cited by examiner

*Primary Examiner* — Glenford J Madamba
(74) *Attorney, Agent, or Firm* — Buchanan Ingersoll & Rooney PC (57) ABSTRACT

A method and system for establishing optimized data streams in a network can be configured for crafting resource-draining Session Description Protocol (SDP) bodies on a call queue.

13 Claims, 4 Drawing Sheets

METHOD AND SYSTEM FOR ESTABLISHING OPTIMIZED DATA STREAMS IN A NETWORK

CROSS-REFERENCE TO RELATED APPLICATIONS

The present application claims priority to European Patent Application No. EP 21 195 810.3 filed on Sep. 9, 2021. The entirety of this European Patent application is incorporated by reference herein.

FIELD

The present invention relates to a method and system for establishing optimized data streams in a network. For example, embodiments relate to a method and system for establishing optimized data streams in a network by crafting resource-draining Session Description Protocol (SDP) bodies on a call queue. Some embodiments can be configured for optimization of Real Time Protocol (RTP) data streams in an Emergency Services IP Network (ESInet) by crafting resource-draining Session Description Protocol (SDP) bodies on the Public Safety Answering Point (PSAP) call queue.

BACKGROUND

After a long time of using switched communication networks the actual development in the field of network communication employed more and more packet-based data networks. Following this trend in communication networks, fixed networks as well as mobile networks move to packet-based data networks.

Recently, an increasing number of services are built on this integrated data-oriented network technology. However, one major issue within such integrated data networks may be call management when the quality of the information that is exchanged between the calling parties is important.

New challenges appear, for example, when services like services of an emergency call network are transferred to data technology in order to benefit from the possibility to exchange all types of data. In the scenario of an emergency call, the conditions of an incident are not known and thus the callTaker or callee needs to obtain the best overview of the emergency scene. It therefore may be desired by the callTaker to use a service such as a video with a high resolution in order to get a good impression from the actual incident. However, videos of high resolution may consume a huge amount of bandwidth which may not be available in particular in cases where mobile networks and/or mobile network devices are used by the caller.

The state of the art already describes some solutions for optimizing a data stream.

The document Large-scale Video Classification with Convolutional Neural Networks, by Andrej Karpathy et al., published in CVPR '14: Proceedings of the 2014 IEEE Conference on Computer Vision and Pattern Recognition, June 2014 Pages 1725-1732; https://doi.org/10.1109/CVPR.2014.223 discloses multiple approaches for extending the connectivity of a CNN (Convolutional Neural Network) in time domain to take advantage of local spatio-temporal information and suggests a multiresolution, foveated architecture as a promising way of speeding up the training.

U.S. Pat. No. 9,281,964 B2 relates to a method of establishing optimized media path and signaling gateway for implementing this method.

U.S. Pat. No. 8,346,945 B2 describes dynamic SDP update in IPDC (Internet Protocol Datacasting) over DVB-H (Digital Video Broadcasting-Handheld).

U.S. Pat. No. 7,760,744 B1 relates to media path optimization for multimedia over the Internet protocol.

SUMMARY

However, we have recognized that it may be likely that media re-negotiations are used to find a compromise between the desired capabilities of a data stream and the capabilities of the available resources. In order to achieve such a good compromise a negotiation between caller and callTaker and in particular of their devices may be necessary, which may result in upgrading or downgrading the data stream.

For instance, in an emergency network, it may happen that the available resources of the callTaker are limited and not all calls can be handled simultaneously. This may be the case in scenarios of mass accidents, where a plurality of callers may try to reach an emergency responder. Consequently, some of the calls and/or data streams may need to be queued in order to be handled by the callTaker.

A lot of time may be lost, if the media re-negotiations are only made after the next data stream waiting in the queue is served by the callTaker.

Embodiments of our system and method can be configured for establishing optimized data streams in a network and overcome the disadvantages of the prior art e. g. be configured to keep the time for re-negotiations as short as possible, or to attempt to minimize the time for re-negotiations based on a pre-selected set of re-negotiation criteria.

A method for establishing optimized data streams in a network is provided that can include: notifying, by one or more Public Safety Answering Point (PSAP) elements, an Emergency Selective Routing Proxy (ESRP) element about one or more calls with corresponding indicentIDs of one or more callers in one or more queues, comparing, by the ESRP element, the one or more calls in the one or more queues with all active and queued calls monitored by the ESRP element, identifying, by the ESRP element, if there are calls with a same incidentID among the compared calls, querying, by the ESRP element, all PSAP elements having identified compared calls with same incidentID, to identify if a re-negotiation for optimization of stream conditions has been performed, if yes, receiving, by the ESRP element, a list of Session Description Protocol (SDP) codecs that have been exchanged during the re-negotiation from the identified PSAP elements, selecting, by the ESRP element, a SDP codec having a first optimization level for establishing a data stream among the list of SDP codecs; evaluating, by the one or more PSAP elements, if the first optimization level for establishing a data stream is acceptable, sending, by the one or more PSAP elements, a re-invite message to one or more caller devices in the one or more queues in case, the first optimization level was acceptable, querying, by the ESRP, the one or more caller devices in the one or more queues if the SDP-codec having the first optimization level is supported, instructing, by the ESRP, the one or more PSAP elements to exchange the SDP-codecs of the one or more calls in the one or more queues with the SDP-codec having the first optimization level, and establishing, by the one or more PSAP elements, a data stream with the SDP-codec having the first optimization level.

According to the invention, a Public Safety Answering Point (PSAP) element is understood as an entity responsible for receiving emergency calls and processing those calls according to a specific operational policy. A Session Description Protocol (SDP) is understood as a standard syntax contained in a signaling message to negotiate a real time media session. A codec is understood as a device or computer program which encodes or decodes a data stream or signal. This can be an audio codec, video codec, or other media codec. In the sense of the invention, a data stream is also understood to be a media stream or signal that can transmit all media and data formats. A network is understood as any type of computer network. This can be a local network as well as a cloud-based or decentralized network. In particular, a network is understood to be an emergency call network such as the ESInet. An Emergency Services IP Network (ESInet) is a managed IP network that is used for emergency services communications, and which can be shared by all public safety agencies. It provides the IP transport infrastructure upon which independent application platforms and core services can be deployed, including, but not restricted to, those necessary for providing emergency services. ESInets may be constructed from a mix of dedicated and shared facilities. ESInets may be interconnected at local, regional, state, federal, national and international levels to form an IP-based inter-network (network of networks). The term Emergency Services IP Network (ESInet) designates the network, not the services that ride on the network. An Emergency Services Routing Proxy (ESRP) element can be understood as a SIP (Session Initiation Protocol) proxy server that selects the next hop routing within the ESInet based on location and policy. There is an ESRP on the edge of the ESInet. There is usually an ESRP at the entrance to a New Generation (NG) PSAP. There may be one or more intermediate ESRPs between them.

For instance, a Public Safety Answering Point (PSAP) element can be an entity responsible for receiving emergency calls and processing those calls according to a specific operational policy. The PSAP element can be a communication device that includes a processor connected to a non-transitory memory and at least one transceiver and also be connectable to or include one or more input devices (e.g. a keyboard, a mouse, a touch screen display), one or more output devices (e.g. a display).

As another example, the ESRP element can be a can be a computer device that includes a processor connected to a non-transitory memory and at least one transceiver. In some embodiments, an ESRP element can include a server that is a computer device that hosts one or more telecommunication services and has hardware that includes a processor connected to a non-transitory computer readable medium and at least one transceiver. At least one input device and/or output device can also be communicatively connectable to the ESRP element.

A level of optimization can be understood to mean that a codec is selected which, in terms of establishing a suitable data stream, provides both the caller and the called party with an intelligible and fluid, i. e., which is almost complete interruption-free or interference-free, audio, visual or media communication in terms of the technical aspects. However, according to embodiments of the method, both the device or the controlling/transmitting element of the device, such as a caller's device or a PSAP element, must be able to process or use the selected codec according to their technical (pre-) configuration. In embodiments of the method this can be expressed by the acceptance of the codec which means that the elements can use the codec according to their technical specifications. Further, a first optimization level can refer to the lowest level of optimization that can be performed. For example, the list of SDP codecs can be arranged in such a way that the codec with the lowest optimization level is placed at the top and then the other codecs are listed in order of their optimization level, from low to high. In other implementations, the opposite can be presented so that the list of SDP codecs can be arranged so that the highest optimization level is at the top and the other codecs are listed in order of their optimization level from high to low.

According to a preferred embodiment of the method, in the case that no match in the incidentIDs were found among the compared calls, the method can also include identifying, by the ESPR element, if there are calls with a same geolocation among the compared calls. In some implementations, this can be performed after the identifying, by the ESPR element, if there are calls with a same incidentID among the compared calls, is performed.

According to another preferred embodiment of the method, wherein no match was identified (no calls with same geographic location or same incidentID) and/or wherein no re-negotiation was identified among the compared calls, the method can also include: gathering, by the ESRP element, media streams of the one or more calls of the one or more queues of the one or more PSAP elements, and media streams of all active calls of all the PSAPs monitored by the ESRP element, comparing, by the ESRP element, using a machine learning, ML, engine the content of the media streams of the one or more calls of the one or more queues of the one or more PSAP elements, with content of media streams of all active calls of all the PSAPs monitored by the ESRP element, and identifying, by the ESRP element, whether a re-negotiation of media streams has occurred on active calls wherein the comparison of the content of the media streams between active and queued calls was similar.

According to still another preferred embodiment of the method, the machine learning engine resides in the ESRP element such that it can be run by the ESRP element or the ESRP element can support the running of the machine learning engine.

Further, according to another preferred embodiment of the method wherein, if the first optimization level for establishing a data stream is not acceptable by the ESRP for one or more PSAP elements, the method can also include repeating the selecting, by the ESRP element, a SDP-codec having a first optimization level for establishing a data stream among the list of SDP-codecs step with another SDP codec having a second optimization level or any further optimization level (e. a third optimization level, a fourth optimization level, etc.) until an acceptable optimization level is found.

According to yet another preferred embodiment of the method wherein, if the SDP-codec having the first optimization level is not supported by the one or more caller devices of the one or more queues, the method further comprising, repeating the following listed steps:
  selecting, by the ESRP element, a SDP-codec having a first optimization level for establishing a data stream among the list of SDP-codecs;
  evaluating, by the ESRP for the one or more PSAP elements, if the first optimization level for establishing a data stream is acceptable,
  sending, by the one or more PSAP elements, a re-invite message to one or more caller devices in the one or more queues in case, the first optimization level was acceptable, and
  querying, by the ESRP, the one or more caller devices in the one or more queues if the SDP-codec having the first optimization level is supported, with another SDP codec having a second or any further optimization level until an acceptable optimization level is found. For instance, these steps can include:

- selecting, by the ESRP element, a SDP-codec having a second optimization level for establishing a data stream among the list of SDP-codecs;
- evaluating, by the ESRP for the one or more PSAP elements, if the second optimization level for establishing a data stream is acceptable,
- sending, by the one or more PSAP elements, a re-invite message to one or more caller devices in the one or more queues in case, the second optimization level was acceptable, and
- querying, by the ESRP, the one or more caller devices in the one or more queues if the SDP-codec having the second optimization level is supported,
- selecting, by the ESRP element, a SDP-codec having a third optimization level for establishing a data stream among the list of SDP-codecs;
- evaluating, by the ESRP for the one or more PSAP elements, if the third optimization level for establishing a data stream is acceptable,
- sending, by the one or more PSAP elements, a re-invite message to one or more caller devices in the one or more queues in case, the third optimization level was acceptable, and
- querying, by the ESRP, the one or more caller devices in the one or more queues if the SDP-codec having the third optimization level is supported.

For the purposes of the invention, a second or any further optimization level can refer to a next higher optimization levels in ascending order after the first optimization level (which can have the lowest optimization level).

According to yet another preferred embodiment of the method, wherein the first, second or any further optimization levels are based on bandwidth requirements that have been predetermined for the one or more PSAP elements and/or the one or more caller devices. Another aim for the optimization process is to deliver appropriate codecs for specific devices. In this sense, optimization levels are based on the fact that the ESRP element or an SIP Server crafts SDP's with the criterion of specific codecs supported by devices and creates lists that have on top the codecs that are the most preferred for each device.

According to yet another preferred embodiment of the method wherein after the instructing, by the ESRP, the one or more PSAP elements to exchange the SDP-codecs of the one or more calls in the one or more queues with the SDP-codec having the first optimization level, is performed, the method can also include re-routing, by the ESRP element, the one or more calls of the one or more queues to an alternate PSAP whereby the re-routing is performed with the optimized SDP codec.

According to yet another preferred embodiment of the method, wherein an extra indication header indicating the optimized SDP codec is added in the optimized SDP.

According to yet another preferred embodiment of the method, wherein the additional indication header is defined as SDP OPTIMIZED: YES.

According to yet another preferred embodiment of the method a HashMap can be used to identify optimized SDP. According to the invention, a HashMap (also called hash table) is understood as a data structure that implements an associative array abstract data type, a structure that can map keys to values. A hash table uses a hash function to compute an index, also called a hash code, into an array of buckets or slots, from which the desired value can be found. During lookup, the key is hashed, and the resulting hash indicates where the corresponding value is stored. For example, the key of the map may be the CallID which ensures uniqueness.

According to yet another preferred embodiment of the method wherein using the SDP-codec in conjunction with one of the Real-Time Transport Protocol (RTP) the Real-Time Streaming Protocol, the Session Initiation Protocol, (SIP), and/or the Session Announcement Protocol (SAP). For the purposes of the invention, a Real Time Protocol (RTP) IP protocol is understood to be a protocol used to transport media (voice, video, text) that has a real-time constraint. The Real Time Streaming Protocol (RTSP) is understood as a network control protocol designed for use in entertainment and communications systems to control streaming media servers. The protocol is used for establishing and controlling media sessions between endpoints. Clients of media servers issue commands such as play, record and pause, to facilitate real-time control of the media streaming from the server to a client (Video On Demand) or from a client to the server (Voice Recording). The Session Announcement Protocol (SAP) is understood as a protocol for advertising multicast session information. SAP typically uses Session Description Protocol (SDP) as the format for Real-time Transport Protocol (RTP) session descriptions. Announcement data is sent using IP multicast and the User Datagram Protocol (UDP).

A system for establishing optimized data streams in a network is also provided. Embodiments of the system can include one or more devices that are arranged and communicatively connectable so that the system can be configured to perform an embodiment of any of the above described methods or other methods discussed herein.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed.

Some embodiments of the system can include an ESInet and/or one or more PSAP elements that can be communicatively connected to other PSAP elements as well as other devices (e.g. one or more ESRP elements and/or one or more caller devices). Other embodiments can be a type of communication device (e.g. a PSAP element, an ESRP element) or a combination of such devices. For instance, some embodiments can include one or more of the devices included in an ESInet that be connected to one or more other ESInet devices (e.g. an ESRP, other PSAPs, etc.).

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Reference numbers used in the drawings include:

| | |
|---|---|
| S1 | Method step S1 |
| S2 | Method step S2 |
| S3 | Method step S3 |
| S4 | Method step S4 |
| S5 | Method step S5 |
| S6 | Method step S6 |
| S7 | Method step S7 |
| S8 | Method step S8 |
| S9 | Method step S9 |
| S10 | Method step S10 |
| S11 | Method step S11 |
| S12 | Method step S12 |
| S13 | Method step S13 |
| S14 | Method step S14 |
| S14a | Method step S14a |
| S15 | Method step S15 |
| Inc1 | Incident with ID 1 |
| call1 | call with call ID 1 |
| call2 | call with call ID 2 |
| call3 | call with call ID 3 |
| PSAP1 | Public Safety Answering Point with ID 1 |
| PSAP3 | Public Safety Answering Point with ID 3 |
| PSAPN | alternate Public Safety Answering Point with ID N |
| ESRP | Emergency Services Routing Proxy |
| SDP | Session Description Protocol |
| RTP | Real Time Protocol |
| ML | machine learning engine |
| Caller1 | caller with ID 1 |
| CallerN | caller with ID N |
| CallerN+1 | caller with ID N+1 |
| CallTaker1 | callTaker with ID 1 |
| CallTakerN | callTaker with ID N |

DETAILED DESCRIPTION

Figure 1:
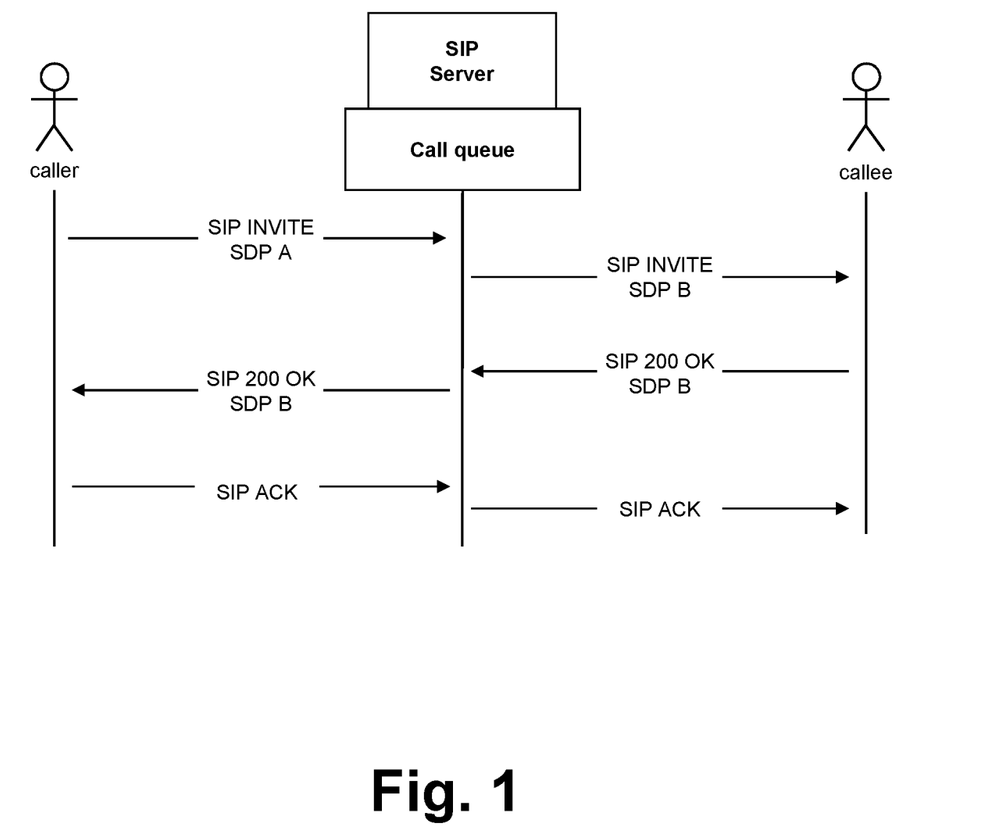
FIG. 1 shows a schematic illustration of a flowchart of the general structure of a first exemplary embodiment of the method.

FIG. 1. shows in a schematic illustration the general structure of the method according to an embodiment of the invention. By crafting resource-draining Session Description Protocol (SDP) bodies on the SIP server queue. A Caller initiates a SIP INVITE request carrying an SDP A body towards the SIP Server. The latter determines the routing destination and forwards the SIP INVITE request to the Callee. The SIP Server can alter the SDP A body to an SDP B body, using custom rules. After the crafting of the SDP body, the SIP INVITE request is conveyed to the callee by carrying an SDP B body.

Figure 2:
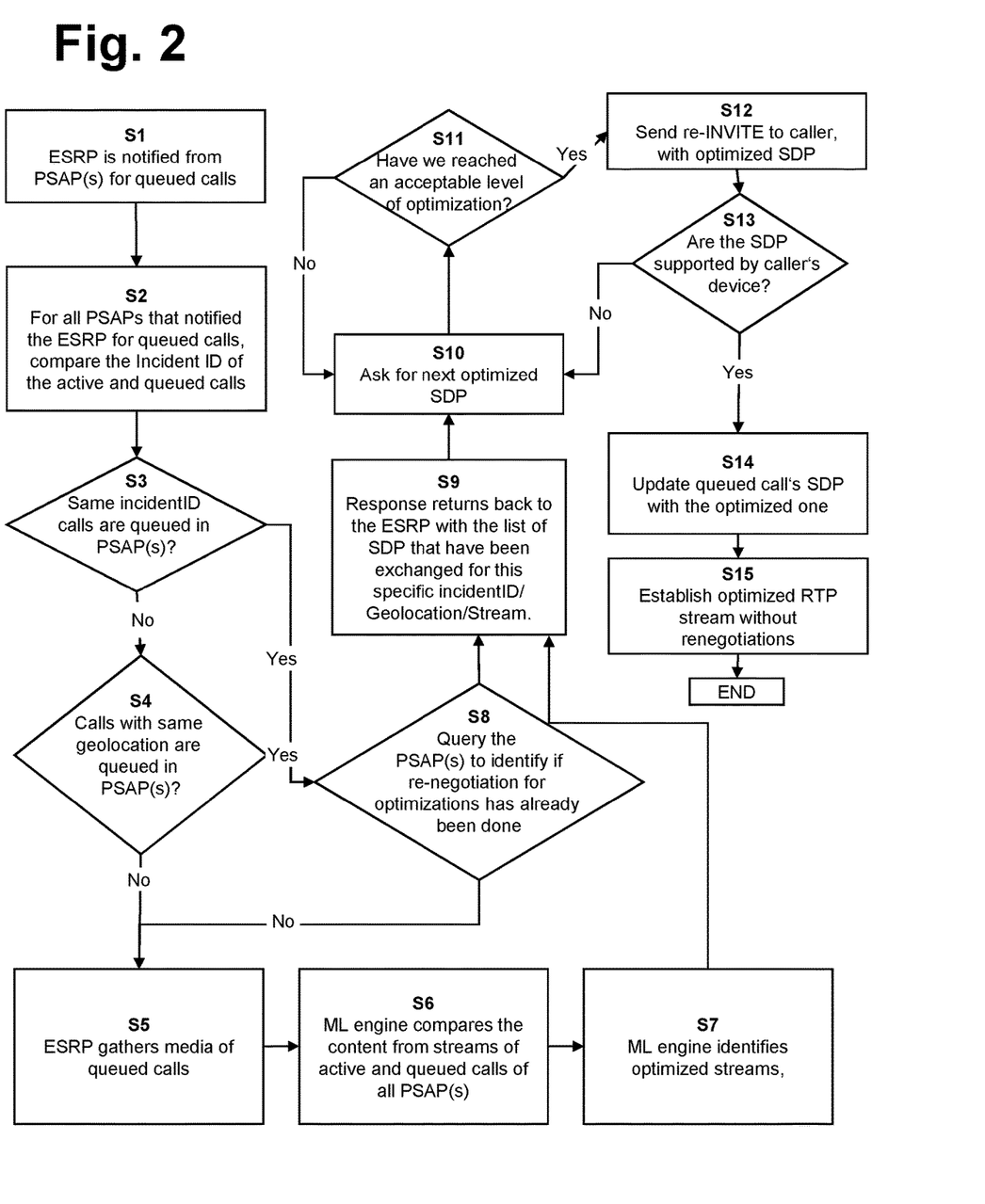
FIG. 2 shows a block diagram of an exemplary embodiment of the method for establishing optimized data streams in a network according to an embodiment of the invention.

FIG. 2 shows in a block diagram steps of the method according to an embodiment of the invention. In step S1 of this block diagram an ESRP element is notified from a PSAP or a plurality of PSAPs that queued calls exist in it/them. It is considered that this takes place at timepoint t0. As a next step, the ESRP compares incidentIDs (S3) and/or geolocation information (S4) for queued calls from the PSAPs about which it was previously notified, with active calls that are already being served on the PSAPs which are under observation of the ESRP. In case it is not possible to identify similar incidentIDs or geolocation data for active calls compared with the queued calls, the ESRP gathers media streams from the queued calls, in step S5. In step S6, a machine learning engine (ML engine) which can be reside in an ESRP element, compares these gathered media streams with the media streams of active calls being served on the PSAPs which are under observation of the ESRP. In step S7 the machine learning engine ML identifies optimized media streams from active calls, regardless of the PSAP they come from. The machine learning engine ML comparison can be performed e. g. using frameworks described in Karpathy, A. et al., 2014, Large-scale video classification with convolutional neural networks. In Proceedings of the IEEE conference on Computer Vision and Pattern Recognition (pp. 1725-1732), https://www.youtube.com/watch?v=LAV56E-mWoo, https://www.youtube.com/watch?v=qrzQ_AB1DZk or https://www.pyimagesearch.com/2019/07/15/video-classification-with-keras-and-deep-learning/. This is based on the fact that a callTaker may trigger few media re-negotiations with the caller, in order to gather all information needed from the available stream. However, this is considered an additional load on each PSAP's bandwidth, thus if optimized media streams are found, these were promoted to other PSAPs with queued calls as well. However, the steps S5-S7 may not be necessary, in case of similar calls (e.g. calls with the same incidentID or geolocation data are already identified either in step S3 or in step S4). Subsequently, in step S8, the ESRP queries the PSAPs to find out if a re-negotiation of codecs has been triggered. In case this is true, in step S9, the ESRP receives the responses of all the PSAPs in which a re-negotiation has been performed. The responses each are compiled in a single list with optimized SDP codecs wherein the optimized SDP codecs are labeled or arranged in the list according to their level of optimization. Then, in step S10, the optimized SDP codec in the list that has the lowest optimization level is selected. In step S11, a check takes place to verify if the level of stream optimization is considered satisfying enough for the PSAPs who should answer the call. If the ESRP at this stage identifies that the current level of optimization of the media stream is fair enough for the current needs of each one of the PSAP that it monitors, the ESRP will terminate the process. More precise, it will terminate the process, when it identifies that the current SDP body e. g. the SDP codec in the list is fair enough for the requirements that have been set for the specific PSAP. Such requirements can be, for example, required bandwidth which assumes a stable and smooth transfer of stream data. In case the current SDP codec is fair enough, the ESRP picks the current SDP from the list, and it will instruct the PSAP to inject the specific SDP body in the corresponding SIP INVITE request that waits on the call queue. In this step, it is assumed that the ESRP monitors a number of different PSAPs. Thus, it is easy to ping them and identify calls which have been routed in different PSAPs and refer to the same incident (i. e., they have the same incidentID/geolocation). Under this context, using the proposed method the SDP body of a queued call can be altered, e. g. in the PSAP1, while the active call that gives the information of the SDP history of this incident is served on PSAP2. In step S12, a message, e. g. a re-INVITE message is sent to each of the callers in queue, whose streams were found similar before compared with the active calls. This step will reassure that each caller's device can support the updated optimized SDP codec. If a caller's device cannot support this updated optimized SDP, then the steps S10-S12 are repeated with another SDP codec which has the next higher optimization level compared to the previous optimized SDP codec as described in step S9 using the list of SDP codecs created in S9 which have already been optimized. If the caller's device supports the optimized SDP codec, then in step S14 the queued call(s) are updated with the optimized SDP codec. Moreover, an extra indication header, SDP OPTIMIZED: YES, may be added to declare that the caller's media streams are now optimized. This ensures that this process will not be repeated in case the queued call(s) is/are re-routed to some other PSAP. Finally, in step S15, when call is answered, no SDP codecs re-negotiations are needed, and the callTaker may serve the call and retrieve all available media information. The proposed method requires a mechanism in order to identify if the optimization process has already been triggered and completed for an active call running in the PSAP element. It is an option of the invention to ping the monitored PSAPs in order to retrieve this piece of info, rather than deploy such a solution in the ESRP. This is done because even if the ESRP monitors a number of PSAPs, it cannot be sure that the signaling messages will be exchanged from the same ESRP element. Thus, the ESRP pings the PSAP to get the necessary information. The returned information can be computed on the PSAP by using a very simple algorithm. For example, for each active call, the PSAP may monitor the exchanged signaling messages that carry an SDP body, as a result of the process of re-negotiations on top of the active call. In case a difference in the SDPs is detected between the different re-negotiations, then the algorithm will mark the SDP details in a HashMap. Thereby, the key of the map may be the CallID which ensures uniqueness. After the process is finished, the PSAP has a map with all the negotiations that have been performed for a specific call. According to the history of the process the PSAP may create a list with all the codecs that have been negotiated between the caller and the callee for each session. In this list, the codecs may be placed in a reverse order. The worst codec may be on the top, while the best one will be on the bottom, following a resource-efficient logic. The ESRP is then able to pick the most resource-efficient codec on the top of the list returned by the PSAP. The purpose of this is that the 'worst' codecs provide the least bandwidth consumption, along with a low sound/video quality, which—however—may result in a low user experience. At this point, ESRP can decide if it has enough bandwidth available to ask for the next—and more efficient—SDP from the list.

Figure 3:
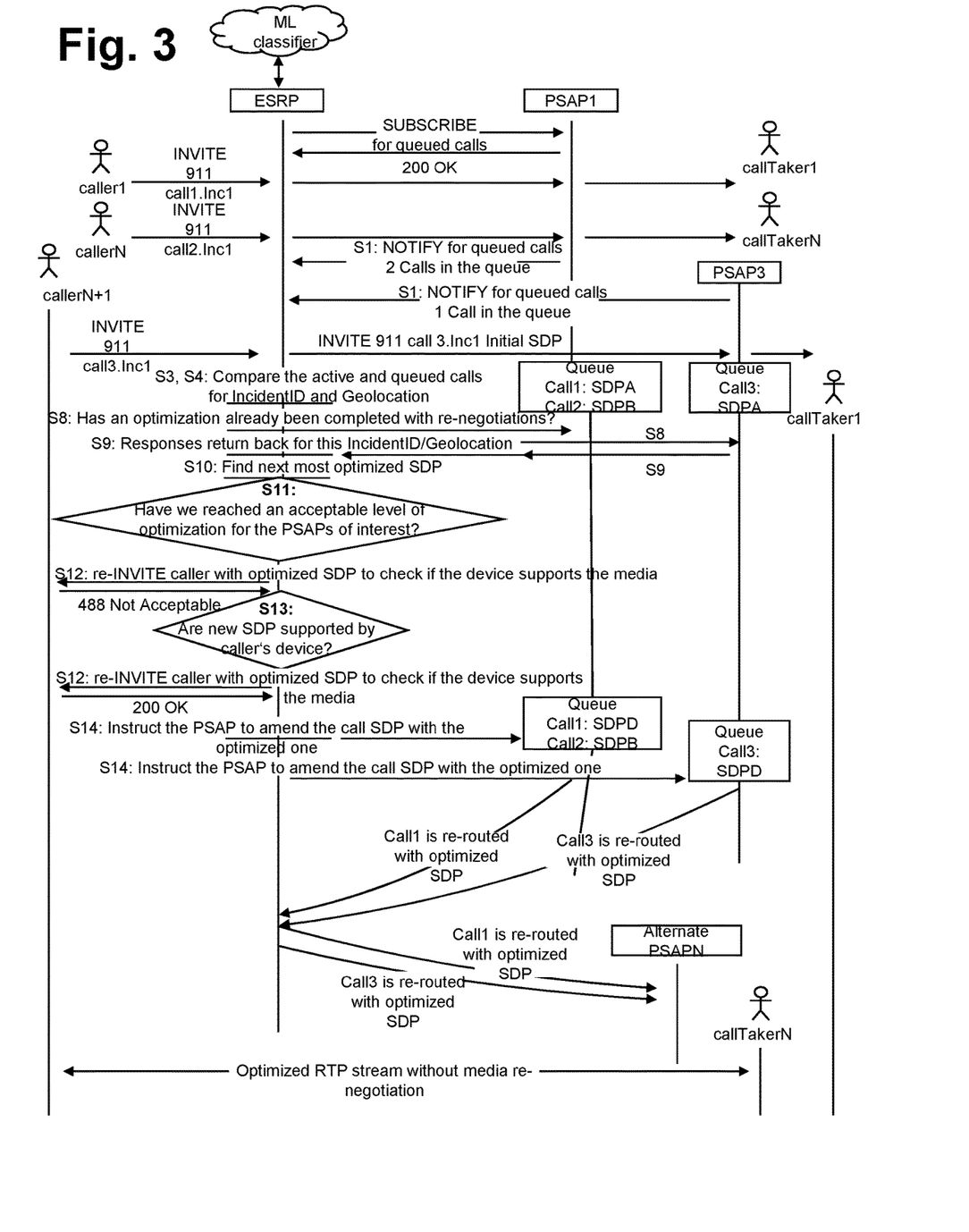
FIG. 3 shows a schematic illustration of a flowchart of the method according to another embodiment of the invention.

FIG. 3 shows a flowchart of the method according to another embodiment of the invention. According to this example, several calls, call1, call2 and call3, referring to the same incident, Inc1, come into the ESRP, and they are routed to PSAP1 and PSAP3. Some of them are inserted in call queues (Call1 and Call2 are in the queue of PSAP1 while Call3 is in the queue of PSAP3). Since the ESRP has subscribed to PSAPs for queued calls via a subscribe/notify mechanism, it receives NOTIFY messages for queued calls existence in S1. Subsequently, in S2, S3, S4, the ESRP compares the active and queued calls of the PSAPs that sent a notification, to identify those with common incidentID and/or geolocation. If such queued calls are found, the ESRP asks the PSAPs for their optimized SDP in S8, e.g. in form of a list. If optimization has already been executed for the asked incident, the PSAPs already have available optimized SDPs and provide them to the ESRP in S9. The ESRP traverses the codec till the optimization criterion is satisfied, S10-S11, taking as well into account the configuration parameters that have been provided by the ESRP. After the SDP codec selection, a re-negotiation with the selected SDP codec takes place towards the caller's device. In case it is not successfully completed, in S13, next available optimized SDP codec are retrieved. When re-negotiation is complete with the optimized codec, the ESRP informs the PSAP which has the call in its queue, to realize the SDP codec update on the signaling event, S14. In the example shown in FIG. 3, optimization was performed for the SDP with CodecA. For example, one could assume that an optimization was performed with SDP CodecC but in step S13 it turned out that the calling device does not support this CodecC (not shown in FIG. 3) and then the optimization was performed with SDP CodecD. In case a call stays too long in a queue (here Call1 in PSAP1 and Call3 in PSAP3), it may be decided that it should be re-routed to an alternate PSAPN, for load balancing reasons. When the call(s) is/are answered by a callTakerN of the latest PSAPN, the updated SDP will be used. There is no need for the previously described process to be re-executed. CallTakerN serves the call without redundant re-negotiations, having at the same time efficient stream available.

Figure 4:
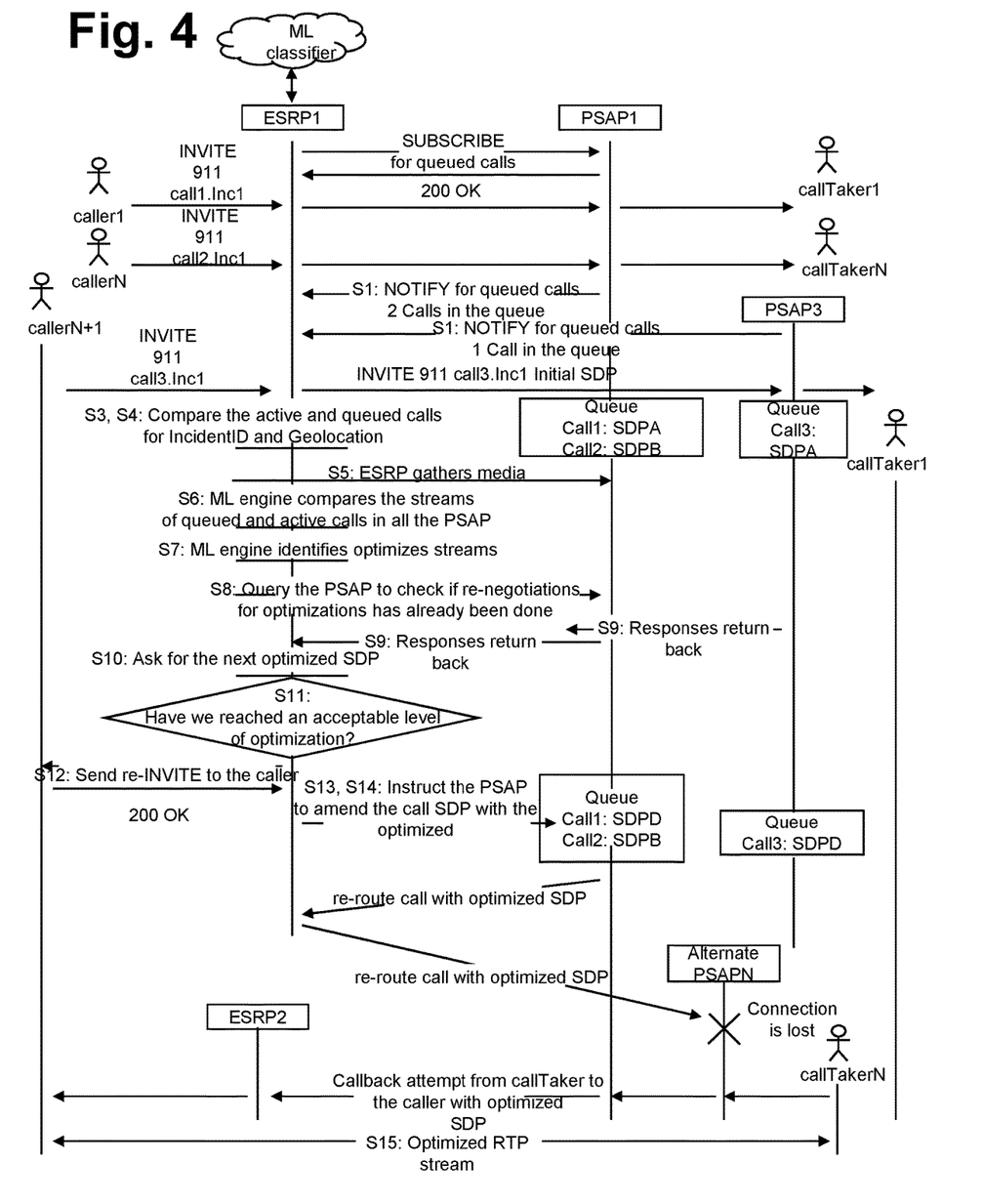
FIG. 4 shows another schematic illustration of a flowchart of the method according to another embodiment of the invention.

FIG. 4 shows another flowchart of the method according to another embodiment of the invention. In this embodiment the problem in which neither a geolocation nor an incidentID match has been found between the active and the queued calls is addressed. In this case, the proposed method will request media content from the emergency caller(s) in S5, while the call has been stuck on the call queue. In S6 the method will compare the media content of the queued calls to the content of the active calls using machine learning (ML) techniques. In S7 the ML engine (also named ML classifier) will present the comparison results. In case there is a match in the media streams content, this entails that the media content refers to the same geolocation and incident. Thus, in S8 the ESRP element sends a ping query to the PSAPs with the aim to retrieve information regarding the optimization history of the specific calls. That is, in case the signaling messages have already been exchanged for the active call which matched the queued call, then the ESRP queries the PSAP in order to identify which is the list of the codecs that have been exchanged in the PSAPs for this active call. In S9, the ESRP obtains the responses regarding the optimization of the active call. In S10, the ESRP starts traversing the list of the codecs from the lowest to the highest optimization level. In S11, the ESRP checks if an acceptable level of optimization has been reached based on the current conditions and the configuration that has been performed in the ESRP. This means that as traversing the list with the codecs, the SDP information found is more and more efficient in terms of communication quality, but it gets even more resource-constraint. In this sense, the proposed method should stop on the best selection taking also into account, if an acceptable optimization level has been reached. After selecting the codec, in S12 the proposed method sends a re-INVITE to the emergency caller in order to identify if this codec is supported by the user. This re-negotiation is sent over the channel that is already open with an Interactive Voice Response (IVR) as the caller waits on the call queue. If the caller device sends a 200 OK message, then the ESRP sends a message to the PSAP in order to amend the SDP info for this call in the queue. In a different case (depicted in FIG. 3), if the caller device sends a 488 not acceptable message, then the proposed method will continue to the next available codec (here SDP with codecD aka SDPD for calls 1 and 3 in the queue was acceptable). In this direction, as the current embodiment instructs, after the call re-routing to an alternate PSAPN, it is assumed that the call is dropped. Thus, after the callTakerN tries to perform a callback, it initiates the call with the optimized SDP.

Embodiments of the method and systems configured to perform an embodiment of the method can be configured so that, in all cases, the queued call will be already optimized in the signaling level. This can always result in a stream optimization without triggering such a process after the call establishment between the caller and the callTaker. Compared to the prior art, embodiments can also be configured so that the SDP data is crafted while the signaling message for initiating the emergency call sits on the call queue and further with the aim to avoid future re-negotiations for stream optimization after the call establishment, and mostly for optimizations that have already been done for the same geolocation/incidentID. Furthermore, embodiments can be executed only for the first call. The next calls referring to the same geolocation/incidentID can use the SDP historical data of the first call.

It should be noted that the term "comprising" does not exclude other elements or steps and the "a" or "an" does not exclude a plurality. Further, elements described in association with different embodiments may be combined. It should also be noted that reference signs in the claims shall not be construed as limiting the scope of the claims.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for establishing optimized data streams in a network, comprising:
   notifying, by one or more Public Safety Answering Point (PSAP) elements, an Emergency Services Routing Proxy (ESRP) element about one or more calls with corresponding incidentIDs of one or more callers in one or more queues,
   comparing, by the ESRP element, the one or more calls in the one or more queues with all active and queued calls monitored by the ESRP element,
   identifying, by the ESPR element, if there are calls with a same incidentID among the compared calls,
   querying, by the ESRP element, all PSAP elements having identified compared calls with same incidentID, to identify if a re-negotiation for optimization of stream conditions has been performed, if yes,
   receiving, by the ESRP element, a list of Session Description Protocol (SDP) codecs that have been exchanged during the re negotiation from the identified PSAP elements,
   selecting, by the ESRP element, a SDP codec having a first optimization level for establishing a data stream among the list of SDP codecs;
   evaluating, by the ESRP for the one or more PSAP elements, if the first optimization level for establishing a data stream is acceptable,
   sending, by the one or more PSAP elements, a re-invite message to one or more caller devices in the one or more queues in case, the first optimization level was acceptable,
   querying, by the ESRP, the one or more caller devices in the one or more queues if the SDP codec having the first optimization level is supported,
   instructing, by the ESRP, the one or more PSAP elements to exchange the SDP codecs of the one or more calls in the one or more queues with the SDP codec having the first optimization level, and
   establishing, by the one or more PSAP elements, a data stream with the SDP codec having the first optimization level.

2. The method according to claim 1, wherein after the identifying, by the ESPR element, if there are calls with a same incidentID among the compared calls, in the case that no match in the incidentIDs were found among the compared calls, the method further comprising:
   identifying, by the ESRP element, if there are calls with a same geolocation among the compared calls.

3. The method of claim 2, wherein no match was identified in the identifying, by the ESPR element, if there are calls with a same incidentID among the compared calls, and no match was identified from the identifying, by the ESRP element, if there are calls with a same geolocation among the compared calls, and/or wherein no re-negotiation was identified among the compared calls from the querying, by the ESRP element, all PSAP elements having identified compared calls with same incidentID, to identify if the re-negotiation for optimization of stream conditions has been performed, the method further comprising:
   gathering, by the ESRP element, media streams of the one or more calls of the one or more queues of the one or more PSAP elements, and media streams of all active calls of all the PSAPs monitored by the ESRP element,
   comparing, by the ESRP element, using a machine learning (ML) engine the content of the media streams of the one or more calls of the one or more queues of the one or more PSAP elements, with content of media streams of all active calls of all the PSAPs monitored by the ESRP element, and
   identifying, by the ESRP element, whether a re-negotiation of media streams has occurred on active calls wherein the comparison of the content of the media streams between active and queued calls was similar.

4. The method according to claim 3, wherein the MLengine resides in the ESRP element.

5. The method of claim 1, wherein, if the first optimization level for establishing a data stream is not acceptable by the one or more PSAP elements during the evaluating, by the ESRP for the one or more PSAP elements, if the first optimization level for establishing a data stream is acceptable, the method further comprising, selecting, by the ESRP element, a SDP codec having at least one additional optimization level for establishing a data stream among the list of SDP codecs until an acceptable optimization level is found.

6. The method of claim 1, wherein, if the SDP codec having the first optimization level is not supported by the one or more caller devices of the one or more queues, the method further comprising:
   selecting, by the ESRP element, a SDP codec having a second optimization level for establishing a data stream among the list of SDP-codecs;

evaluating, by the ESRP for the one or more PSAP elements, if the second optimization level for establishing a data stream is acceptable, sending, by the one or more PSAP elements, a re-invite message to one or more caller devices in the one or more queues in case, the second optimization level was acceptable, querying, by the ESRP, the one or more caller devices in the one or more queues if the SDP-codec having the second optimization level is supported.

7. The method of claim 6, wherein the first optimization level and the second optimization level are based on bandwidth requirements that have been pre-determined for the one or more PSAP elements and/or for the one or more caller devices.

8. The method of claim 1, the method further comprising:
after performance of the instructing, by the ESRP, the one or more PSAP elements to exchange the SDP-codecs of the one or more calls in the one or more queues with the SDP codec having the first optimization level, re-routing, by the ESRP element, the one or more calls of the one or more queues to an alternate PSAP whereby the re-routing is performed with the optimized SDP codec.

9. The method of claim 1, wherein an extra indication header indicating the optimized SDP codec is added in the optimized SDP.

10. The method according to claim 9, wherein the additional indication header is defined as SDP OPTIMIZED: YES.

11. The method of claim 1, wherein a HashMap is used to identify optimized SDP.

12. The method of claim 1, wherein the SDP codec is used in conjunction with one of the Real-Time Transport Protocol (RTP), the Real-Time Streaming Protocol (RTSP), the Session Initiation Protocol (SIP), and/or the Session Announcement Protocol (SAP).

13. A system for establishing optimized data streams in a network, comprising:
one or more Public Safety Answering Point (PSAP) elements communicatively connectable to an Emergency Services Routing Proxy (ESRP) element;

the one or more PSAP elements configured to notify the ESRP element about one or more calls with corresponding incidentIDs of one or more callers in one or more queues, the ESRP element configured to compare the one or more calls in the one or more queues with all active and queued calls monitored by the ESRP element and identify whether there are calls with a same incidentID among the compared calls, the ESRP element configured to query all PSAP elements having identified compared calls with same incidentID to identify whether a re-negotiation for optimization of stream conditions has been performed so that in response to a determination that the re-negotiation for optimization of the stream conditions has been performed, the ESRP element receives a list of Session Description Protocol (SDP) codecs that have been exchanged during the re negotiation from the identified PSAP elements, the ESRP element configured to select a SDP codec having a first optimization level for establishing a data stream among the list of SDP codecs, evaluate for the one or more PSAP elements whether the first optimization level for establishing the data stream is acceptable so that that a re-invite message is sendable by the one or more PSAP elements to one or more caller devices in the one or more queues in response to the first optimization level being acceptable, the ESRP configured to query the one or more caller devices in the one or more queues to determine whether the SDP codec having the first optimization level is supported and instruct the one or more PSAP elements to exchange the SDP codecs of the one or more calls in the one or more queues with the SDP codec having the first optimization level in response to the ESRP determining that the one or more caller devices support the first optimization level so that a data stream with the SDP codec having the first optimization level is establishable by the one or more PSAP elements.

* * * * *